May 11, 1965
M. GOLDBERG
3,183,424
REVERSIBLE SINGLE-PHASE MOTOR
Filed Feb. 20, 1962
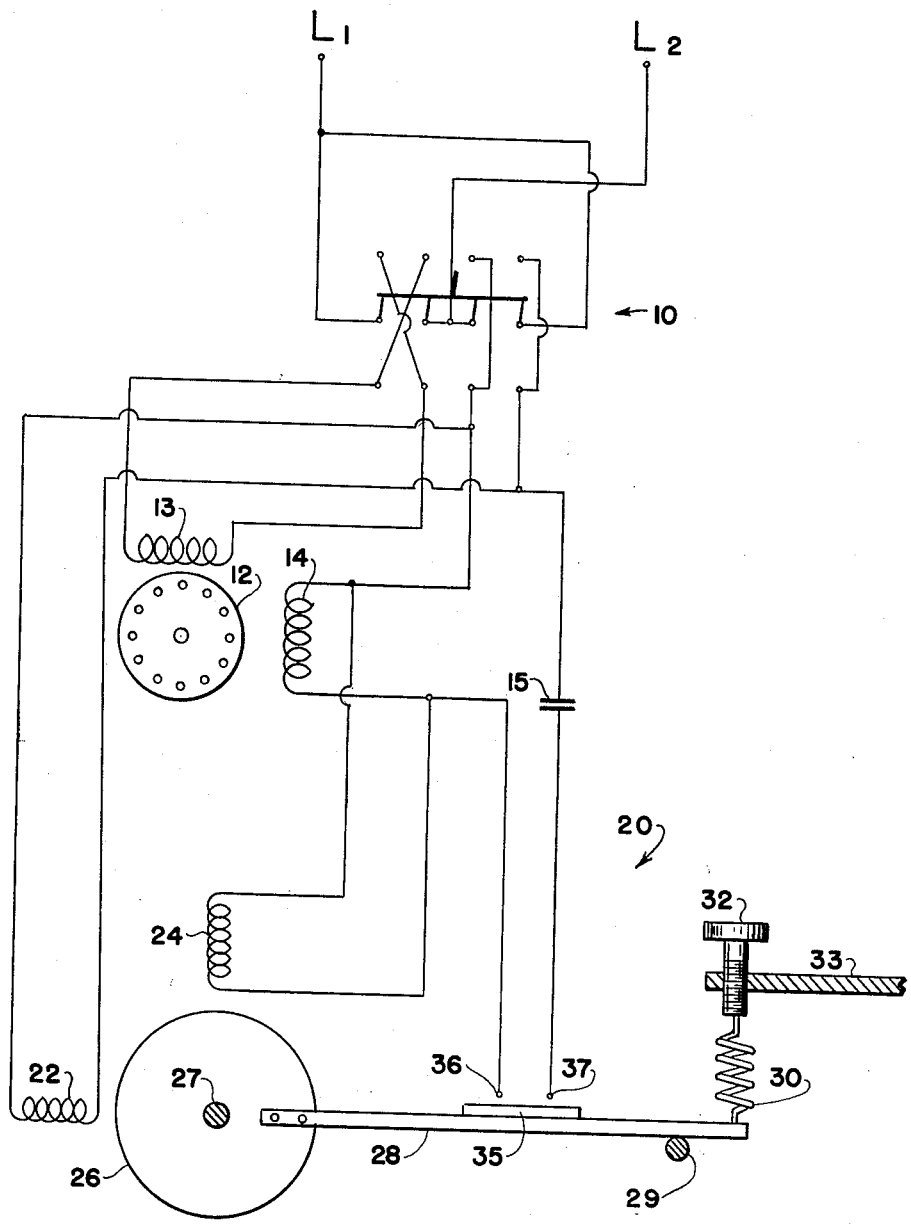
INVENTOR.
MAX GOLDBERG
BY Peter P. Tailer
AGENT

United States Patent Office 3,183,424
Patented May 11, 1965

3,183,424
REVERSIBLE SINGLE-PHASE MOTOR
Max Goldberg, 141 E. 3rd St., New York, N.Y.
Filed Feb. 20, 1962, Ser. No. 174,585
10 Claims. (Cl. 318—207)

This invention relates in general to reversible single-phase electric motors and, more particularly, to a single-phase motor of the split-phase, capacitor-start, or the like type which is capable of rapid reversing or plugging.

Single-phase induction motors generally have a main primary winding and an auxiliary or starting winding which are displaced from each other on the stator of the motor and which carry currents displaced from each other in phase; the phase displacement of the currents being produced either by the design of the windings as in the split-phase motor or by connecting a capacitor or the like in series with the auxiliary winding, as in the capacitor-start motor. In starting motors of this type, both windings are connected to the line in parallel, and because there exists a phase displacement between their currents, a starting torque is developed. After the motor has reached a high enough speed, usually 70 to 80 percent of the rated full-load speed, the starting winding is disconnected to prevent its overheating while the motor continues to run on the main winding alone.

There are many applications of single-phase motors where it is necessary or desirable to be able to reverse the motor substantially instantaneously while it is running. This cannot be done in the ordinary type of single-phase motor since reversing the connections of the starting winding while the motor is running has no effect, as this winding is disconnected by means of a centrifugal switch or the like while the motor is running at over 70 to 80 percent of full speed. Reversing the connections of the main winding has no effect while the motor is running because a single-phase motor will continue to run in whatever direction it has been started. In order to reverse motors of this type by plugging, it has heretofore been necessary to provide external relays and special switches for the purpose of reconnecting the starting winding with its connections reversed while the motor is running in order to obtain a reverse torque. These arrangements are undesirable inasmuch as they are costly, complex, and, due to their complexity, prone to failure.

It is, therefore, a main object of the present invention to provide a reversible single-phase motor of the split-phase, capacitor-start, or the like type which can be rapidly reversed, or plugged, while the motor is running and which does not require any external relays, starting switches, or the like so that the motor may be made extremely simple and inexpensively.

A further object of this invention is to provide a reversible single-phase motor which can be rapidly reversed while running by means of a single external manual switch and which does not require the conventional speed responsive devices to disconnect the starting winding.

A still further object of this invention is to provide a reversible single-phase motor of the split-phase, capacitor-start, or the like type having a simple and inexpensive control device which interrupts the circuit of the auxiliary or starting winding at a predetermined speed of the motor in either direction of rotation and which also reconnects the auxiliary winding to the line so that the motor can be quickly reversed while running by merely operating an external line switch.

Many other objects, advantages and features of invention reside in the construction, arrangement and combination of parts and elements involved in the embodiment of the invention and its practice as will be understood from the following description and accompanying drawing wherein:

The figure of the drawing is a schematic diagram showing the electrical connections and the elements of the motor of my invention.

Referring to the drawing in detail, $L_1$ and $L_2$ represent a single-phase alternating current source. Connected through a four pole double throw switch generally designated by the numeral 10 is a main winding 13 and an auxiliary or starting winding 14. The windings 13 and 14 are placed in slots in a stator core (not shown) in the usual manner. These windings are best displaced from each other on the stator core approximately 90 electrical degrees and a phase displacement is produced between their currents by means of a capacitor 15 or the like which is connected in series with the auxiliary or starting winding 14. Suitably disposed in relation to the windings 13 and 14 is a rotor 12 which may be of the squirrel cage type. The operation of the motor is controlled by a control device, generally designated by the numeral 20, as will be hereinafter explained.

As shown in the drawing, the main winding 13 is connected through switch 10 so that it will be electrically reversed as the switch 10 is thrown upwards or downwards. The starting winding 14, however, is connected through switch 10 so that it is not electrically reversed as the switch 10 is thrown upwards and downwards. Thus when switch 10 is thrown upwards, the phase displacement between windings 13 and 14 will start rotor 12 rotating in one direction and, when switch 10 is thrown downward, an opposite phase relation will exist between windings 13 and 14 to start rotor 12 rotating in the opposite direction. A small coil 22 is connected across the current source $L_1$–$L_2$ below switch 10 so that it will not be reversed as switch 10 is thrown upward or downward. Another small coil 24 is connected in parallel across all or a part of the auxiliary or starting winding 14. A copper disk 26 is rotatably mounted by or about an axle 27 with the coils 22 and 24 disposed about its periphery. A satisfactory placement of the coils 22 and 24 is 90 degrees apart about the axle 27 of disk 26. An arm 28 is fixed to and rotates with disk 26. The rotation of arm 28 is limited by a fixed stop 29 and opposed by a tension spring 30. The force required to turn disk 26 may be regulated by means of an adjustment screw 32 which is turned through a fixed element 33 to adjust the tension in spring 30. When switch 10 is open and the motor is not running, spring 30 urges the arm 28 counterclockwise, as it is shown in the drawing, to have the conducting member 35 close the contacts 36 and 37. Therefore, when the switch 10 is open and the rotor 12 is at rest, the spring 30 will draw the arm 28 upward to cause the conducting element 35 to close the contacts 36 and 37. When switch 10 is then closed upward or downward, current will flow from the current source $L_1$–$L_2$ to the primary winding 13 and to the starting winding 14 through the capacitor 15 and the closed contacts 36 and 37.

As the rotor 12 then starts to rotate and gains speed until it reaches 70 to 80 percent, or any other desired percentage, of the rated full load speed of the motor, current will be tapped from the current source $L_1$–$L_2$ into coil 22 and from the starting winding 14 into coil 24. The currents within coil 22 and coil 24 will be displaced from each other in phase so that eddy currents generated in disk 26 will tend to rotate it with a greater and greater torque as the rotor 12 comes up to a desired percentage of its rated full load speed. At this time, the torque exerted by disk 26 will overcome the tension exerted by spring 30 so that arm 28 will move downward to open the contacts 36 and 37. Although the opening of contacts 36 and 37 disconnects the starting winding 14 from the current source $L_1$–$L_2$, a current or E.M.F. is induced within coil 14 by the rotation of rotor 12. This current is continually tapped from coil 14 into coil 24 to maintain a torque on disk 16 and keep the contacts 36 and 37 open.

As switch 10 is thrown to the other position to reverse the motor, the current reversal in main winding 13 causes a current reversal in the current induced in the starting winding 14 by the rotor 12. Since coil 24 is connected across all or a part of the starting winding 14, its current is also reversed so that the phase relation between the coils 24 and 22 is reversed and the disk 26 is now driven counter-clockwise as shown in the drawing. This torque and the spring 30 almost instantly close the contacts 36 and 37 so that the motor is plugged and the rotor 12 has a reverse torque exerted on it.

As the rotor 12 is brought to a stop by this reverse torque, the rotor 12 induces a current in the starting winding 14 which is counter to that of the line current $L_1$–$L_2$. As the rotor 12 comes to a stop and then is turned in the opposite direction, the current induced in the starting winding 14 from the rotor 12 corresponds to a greater and greater extent to the line current $L_1$–$L_2$ which is impressed on the starting winding 14 and tapped into the coil 24. Again, as the rotor 12 comes up to speed in the opposite direction, torque exerted on disk 26 by the coils 22 and 24 will open the contacts 36 and 37.

Thus it may be seen that, when the motor is running in either direction, it can be reversed substantially instantaneously merely by moving the line switch 10 to its other position. When the motor is at rest, it can be started in either direction since the contacts 36 and 37 will then be closed by spring 30. The extremely simple control 20 may be mounted on the frame of a motor or it may be mounted as a control at a distance from the motor.

This invention provides a very simple and a relatively inexpensive arrangement for rapidly reversing or plugging a single-phase motor without the use of external relays or special switches. This is very advantageous since it greatly reduces the cost of single-phase motors for plugging service by eliminating the cost of the relays, centrifugal switches, and other elements which have been heretofore necessary. This control device is simple and positive in action and effects the instantaneous reversal of a motor as soon as a line switch is moved from one position to another to provide the desired operation of the motor in a very simple manner.

It is to be understood that various modifications of the invention are possible without departing from the spirit of the invention. Any equivalent of the four pole line switch may be substituted. A three pole switch or a single reversing switch may be used in some applications and the control device 20 may be modified in various obvious ways. Thus it is not strictly necessary that element 26 be a disk, but it could also be any other rotatably mounted or otherwise movable element which is moved by a phase displacement between two or more coils. In addition, this invention could be used to disconnect one or more windings of a poly-phase motor used on single phase current.

While I have disclosed my invention in the best forms known to me, it will nevertheless be understood that these are purely exemplary and that modifications in the construction, arrangement and combination of parts and the substitution of equivalents mechanically, electrically, or otherwise may be made without departing from the spirit of the invention except as it may be more limited in the appended claims, wherein I claim:

1. In a reversible single-phase induction motor, a main primary winding, an auxiliary or starting winding, a rotor, switch means connecting said primary winding and said auxiliary or starting winding to a single phase current source, said switch means having a first position for operation of said rotor in one direction and a second position for operation of said rotor in the other direction, and control means having a first coil connected across the current source, a second coil connected across at least a portion of said auxiliary or starting winding, an element movably mounted in relation to said first and second coils so as to be moved in response to the phase relation between said first and second coils, and contact means opened by the movement of said element, said contact means being connected in series with said auxiliary or starting winding.

2. Control means to reverse a single-phase induction motor having a main primary winding, an auxiliary or starting winding, a rotor, and first switch means connecting said windings to a current source having a first position for operation of said rotor in one direction and a second position for operation of said rotor in the other direction, said control means comprising a first coil connected to the current source through said switch means, a second coil connected across at least a part of said auxiliary or starting winding, an element movably mounted in relation to said first and second coils to be moved in relation to the phase relation between said first and second coils, and second switch means activated by the movement of said element disconnecting said auxiliary or starting winding from the current source.

3. A reversible single phase induction motor having a main winding, a starting winding, a rotor, first switch means having a first position connecting said main winding to a current source and a second position reversing the connection of said main winding to said current source, a first coil connected to the current source, a second coil connected across at least a portion of said starting winding, an element movably mounted in relation to said first and second coils so as to be moved in response to the phase relation between said first and second coils, and second switch means connecting said starting winding to the current source, movement of said element activating said second switch means disconnecting said starting winding from the current source.

4. A reversible single phase induction motor having a main winding, a starting winding, a rotor, first switch means having a first position connecting said main winding to a current source and a second position reversing the connection of said main winding to the current source, a first coil connected to the current source, a second coil connected across at least a part of said starting winding, an element rotatably mounted in relation to said first and second coils so as to be rotated in response to the phase relation between said first and second coils, and second switch means connecting said starting winding to the current source, said second switch means being opened by rotation of said element.

5. The combination according to claim 4 with the addition of means resisting the rotation of said element.

6. The combination according to claim 4 with the addition of spring means resisting the rotation of said element and the opening of said second switch means.

7. The combination according to claim 6 wherein said element is a metal disk.

8. The combination according to claim 7 with the addition of means adjusting the resistance of said spring means to the rotation of said disk.

9. In a single phase induction motor, a main winding, an auxiliary or starting winding, a rotor, switch means connecting said main winding and said auxiliary or starting winding to a single-phase current source, and control means having a first coil connected to said current source, a second coil connected across at least a portion of said auxiliary or starting winding, an element movably mounted in relation to said first and second coils as as to be moved in response to the phase relation between said first and second coils, and contact means opened by the movement of said element, said contact means being connected between said auxiliary or starting winding and the single-phase current source.

10. The combination according to claim 9 with the addition of spring means resisting the movement of said element and the opening of said contact means.

References Cited by the Examiner

UNITED STATES PATENTS

| 2,235,537 | 3/41 | Schaefer | 318—221 |
| 2,314,239 | 3/43 | Ogden | 318—221 |
| 2,429,049 | 10/47 | Crozier | 318—207 |
| 2,491,643 | 12/49 | Burks | 318—221 |

JOHN F. COUCH, *Primary Examiner.*
ORIS L. RADER, *Examiner.*